May 26, 1936.  E. J. WESTCOTT ET AL  2,042,284
COMBINATION MASH AND LAUTER TANK
Filed March 19, 1934  2 Sheets—Sheet 2

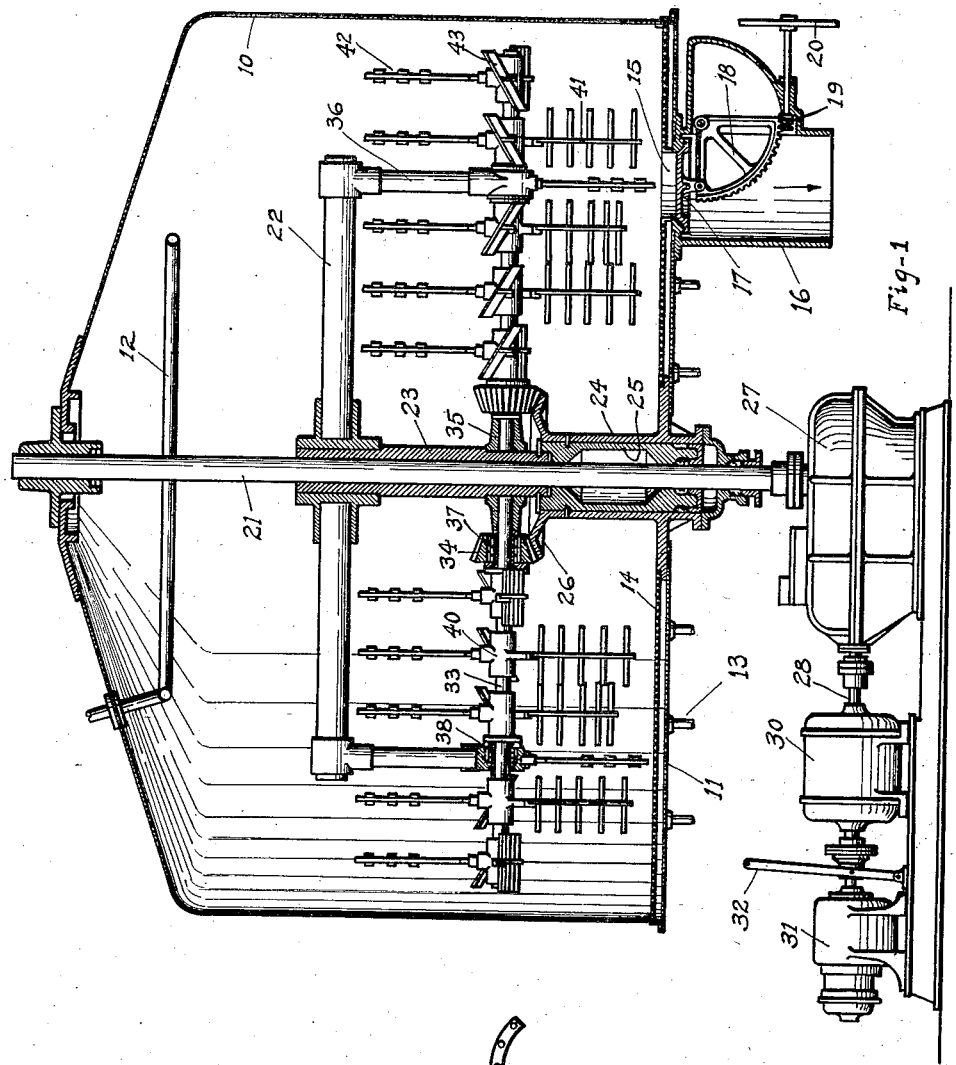
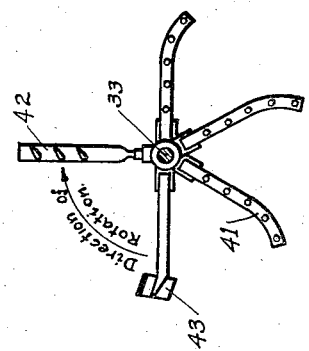
Inventors
Ellsworth J. Westcott.
Albert E. Ruemmele.

Inventors
Ellsworth J. Westcott.
Albert E. Ruemmele.

Patented May 26, 1936

2,042,284

UNITED STATES PATENT OFFICE 2,042,284

COMBINATION MASH AND LAUTER TANK

Ellsworth J. Westcott and Albert E. Ruemmele, Chicago, Ill., assignors to Freyn Engineering Company, Chicago, Ill., a corporation of Maine Application March 19, 1934, Serial No. 716,226

6 Claims. (Cl. 259—102)

The invention relates to improvements in brewing apparatus and has reference more particularly to novel mechanism for more effectively performing the mashing and straining operations, and which will make it possible to carry out said operations in a single receptacle to be known as a combined mash and lauter tank.

In the brewing process the mashing and straining operation to secure the clear wort consists in mixing all the grains used in brewing with clear water and after the proper reactions have taken place the liquid or wort is filtered from the solid materials called the spent grains. The wort continues in the process of brewing and the spent grains are a by-product. A mash strainer tank in extensive use at present consists of a cylindrical steel tank with a perforated false bottom and equipment in the form of an agitator mounted for raising and lowering movements and actuated by suitable hydraulic means. In operation the water and grains are introduced into the tank and the agitating mechanism rotated to thoroughly mix the materials. At the completion of the operation the agitator is stopped and raised by hydraulic means clear of the liquid and the same is then allowed to set for a short period to settle the solid materials on the perforated false bottom of the tank. This settling of the grains on the perforated bottom forms a filter bed through which the liquid can be filtered and drawn off as clear wort. The operation requires considerable time as the filter bed soon becomes impervious because of the fine materials in the nature of slimes which form on the top surface.

A later improvement in equipment for performing the mashing and straining operations makes use of two separate tanks known as a mash tank and lauter or strainer tank. At the completion of the mashing operation the contents of the tank are pumped to the lauter tank where the straining operation is completed in considerably less time than heretofore required due to agitating equipment known to the trade as an Aufhack machine. This equipment performs three separate functions which must be understood to more fully appreciate the merits of the present invention. With the blades turned at 90 degrees to the direction of rotation the liquid is given its maximum agitation, which however, is not as violent as the agitation given the liquid in the mashing operation and therefore the Aufhack machine can not be used for mashing. With the blades turned parallel to the direction of rotation the same assist in the straining operation by cutting through the surface of the filter bed to open up the solid material, thereby permitting a more rapid filtration. As the blades are mounted for vertical movement through suitable hydraulic means they can be made to cut deeper and deeper into the filter bed as the straining operation proceeds. For their third and last position the blades are set at an angle to the direction of rotation and employed in scraping the surface of the perforated bottom to remove the filter bed therefrom and discharge the same into grain valves. The use of two tanks and the equipment described results in a more rapid straining operation and a greater yield but the cost of equipment is correspondingly higher as compared with the single mash strainer tank.

It is an object of the invention to provide a combination mash and lauter tank which wil incorporate the desirable features of the lauter tank although performing both mashing and straining operations in a single receptacle with corresponding reduction in the cost of plant equipment.

Another object of the invention is to provide novel agitating mechanism which will develop the necessary agitation for the mashing operation and in addition satisfactorily perform the grooving or cutting of the filter bed and scraping of the perforated bottom of the tank.

Another object is to provide agitating mechanism of improved construction and which can be applied to existing mash strainer tanks.

Another object of the invention is to provide agitating mechanism which will have rotation in a certain direction to perform one operation and rotation in an opposite direction for performing the remaining operations.

Wth these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is a vertical sectional view taken substantially through the center of a tank showing the same equipped with the mechanism of the invention;

Figure 2 is an end elevational view looking along the axis of the agitator shaft;

Figure 4:
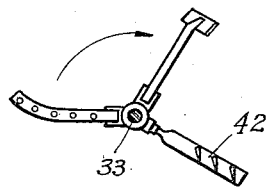
Figure 4 is an end elevational view looking along the axis of the agitator shaft showing the various types of blades carried by the shaft.

Referring to the drawings, particularly Figure 1, a tank or receptacle 10 is shown having a bottom 11 and an inlet for water in the form of a pipe 12. The bottom is provided with a plurality of outlets 13 for conducting the wort from the tank to other apparatus used in the brewing process. Located above bottom 11 is a second or false bottom 14 having perforations therein to permit the liquid to drain from the tank. Formed in the perforated bottom 14 is an opening 15 leading to conduit 16 and normally closed by valve 17. The valves are operated to open and close by the rack 18 meshing with pinion 19 rotated by manual operation of handle 20.

The tank is suitably supported from the floor or from foundation work (not shown) and is provided with the driving shaft 21 extending through the center thereof for supporting the radial arms 22 carried by the sleeve 23 secured to the shaft and fixedly mounting the arms on the driving shaft. The circular upstanding walls 24 are part of the tank and provide a cylinder for housing the hydraulically operated piston 25 comprising the operating part of the hydraulic mechanism which imparts raising and lowering movements to sleeve 23, the bevel gear 26 non-rotatably secured to the piston, and other parts carried by said sleeve.

The lower end of driving shaft 21 operatively connects with suitable speed reducing mechanism housed in casing 27 which in turn connects through rotor shaft 28 with a main driving motor 30 and auxiliary motor 31. The auxiliary motor is connected to shaft 28 through suitable clutch mechanism actuated by lever 32 and is provided in order to increase the range of speeds imparted to driving shaft 21, the main motor rotating said shaft through speed reducing mechanism at speeds approximately 10 to 15 R. P. M. while the auxiliary motor is designed for rotating the shaft at considerably reduced speeds, for example, speeds approximating ⅓ to ½ R. P. M.

Carried by sleeve 23 and the radial arms 22 are a plurality of horizontal agitator shafts 33, having mounted on their inner ends pinions 34 spaced from the sleeve by the hubs 35 which journal the shafts, the pinions having meshing engagement with the bevel gear 26. The outer end of each agitator shaft is supported by a member 36 depending from one of the radial arms 22. Located between each pinion 34 and the agitator shaft associated therewith is a one-way drive clutch 37 of conventional construction and which operates to impart rotation to the agitator shaft when pinion 34 is driven in one direction and to allow the shaft to remain stationary when the pinion is driven in an opposite direction. Also located between each agitator shaft and the connection of the same with the supporting member 36 is another one-way drive clutch 38 of conventional construction and which permits rotation of the shaft 33 when driven by the pinion 34 but prevents rotation of said shaft in the opposite direction. It will be understood from the above that the clutches 37 and 38 may take the form of conventional pawl and ratchet mechanism, as means of this character will allow rotation of the members in a certain direction and prevent their rotation in the opposite direction.

Secured to each agitator shaft in spaced relation longitudinally thereof are a plurality of hubs 40, each hub carrying a set of agitators 41, a blade 42 for opening up the filter bed, and a scraper 43 having utility for scraping the surface of the perforated bottom 14, it being understood, of course, that blade 42 and scraper 43 have additional utility as agitators. The agitators 41 are set at an angle of 90 degrees to the direction of rotation so as to produce the maximum agitation of the liquid and are grouped although spaced in the direction of rotation as shown in Figure 2. The blade 42 is set parallel to the direction of rotation and therefore produces very little stirring up of the liquid. The blade performs the operation of cutting or grooving the filter bed to open up the same for a faster filtration of the liquid. The scrapers 43 are set at an angle to the direction of rotation with the same on each agitator shaft arranged to direct the filter bed toward the opening 15. As the agitator shafts must have a certain position with respect to the level of the liquid during agitation of the liquid, and a different position for opening up the filter bed by blades 42 and still another position for scraping the perforated bottom, the entire operative unit is mounted on driving shaft 21 for movement vertically thereof and which is accomplished as has been described by the piston 25 forming the operative member of suitable hydraulic mechanism. Raising of the piston carries with it the bevel gear 26, sleeve 23 and thus the agitator shafts supported therefrom.

Figure 5:
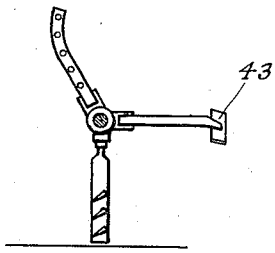
Figures 5 and 6 are views similar to Figure 4 but showing the position the various blades assume for performing their respective operations.
Figure 3:
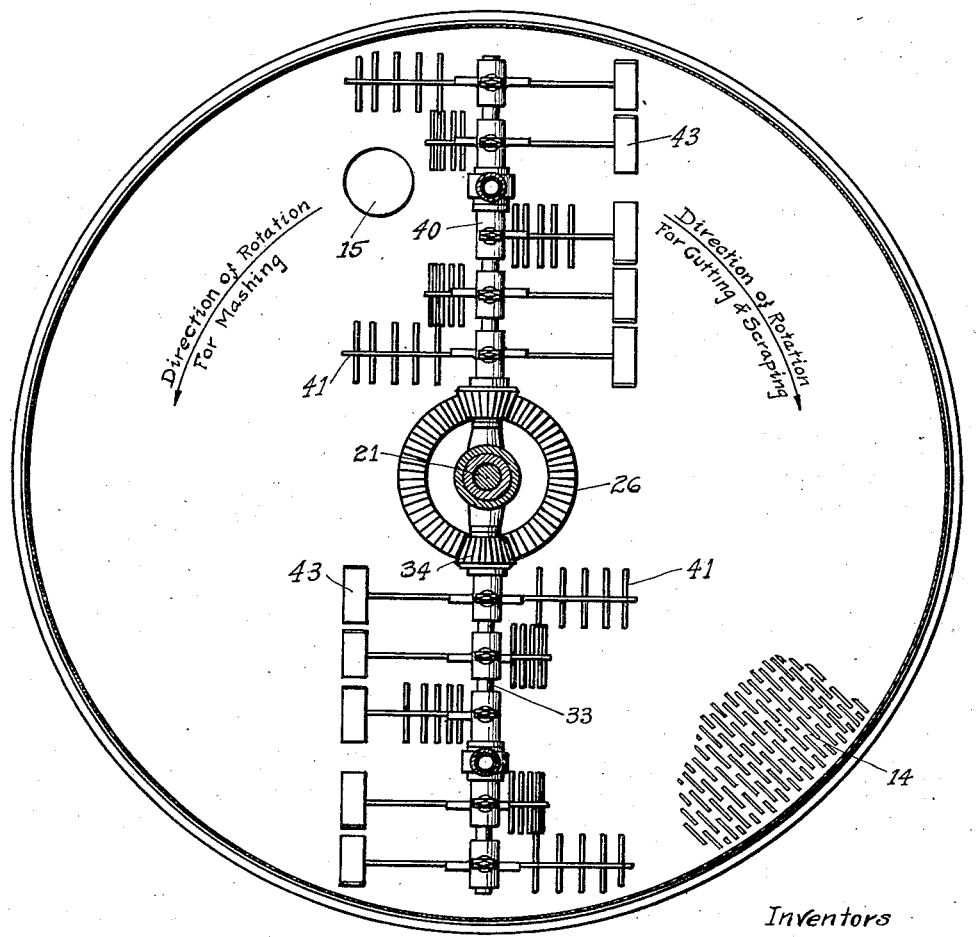
Figure 3 is a top plan view of the structure shown in Figure 1.

As shown in Figure 3, the radial arms 22 have rotation on the axis 21 in both directions to accomplish the operations of mashing as well as straining and scraping the filter bed to discharge the same through the grain opening 15. When the driving shaft 21 is rotated in a counter-clockwise direction, Figure 3, the pinions 34 are caused to revolve in that they mesh with the stationary gear 26 and to drive the agitator shafts 33. The clutches 37 are designed to operatively connect pinions 34 with their associated agitator shaft when rotated by this direction of movement of the arms 22 and likewise the clutches 38 are designed to permit rotation of the said agitator shaft. Accordingly when the arms 22 and the agitator shafts revolve counter-clockwise with shaft 21 as an axis, as shown in Figure 3, the agitator shafts also have rotation on their horizontal axes. This is the mode of operation of the mechanism during the mashing operation and which causes intimate mixture of the water and ground grains and other materials added thereto as required for the brewing of the same. After the proper reactions have taken place the rotation of the driving shaft 21 is stopped and the mechanism is lifted clear of the liquid which is allowed to set for a short period to allow the solid materials to settle on the perforated bottom 14. The clear liquid is then filtered off through the wort outlets 13 in the bottom of the tank and as the operation continues the mechanism is lowered, the blades 42 having been positioned so as to depend from the agitator shafts as shown in Figure 5. The direction of rotation of drive shaft 21 is now reversed, that is, the same is driven clockwise, Figure 3. The agitator shafts, however, are held by the clutches 38 from rotating on their axes, it being recalled that the clutches 37 are inoperative and therefore do not tend to drive the agitator shafts when pinions 34 rotate in the direction caused by the clockwise movement of arms 22. Although the clutches 37 or ratchet mechanism which may be substituted therefor are inoperative, there is a tendency for the agitator shafts to rotate, which of course would destroy the position of the blades 42. The mechanisms 38 therefore hold the shafts with the blades 42 in depending position where they operate to open up the filter bed, thus shortening the time of the filtering operation. The equipment is lowered by the hydraulic means to maintain the proper relation of the blades 42 with the filter bed.

Figure 6:
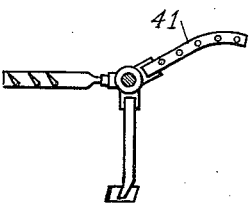

At the completion of the filtering operation the agitator shafts are rotated to bring the scrapers 43 in depending position as shown in Figure 6. The same direction of rotation of drive shaft 21 is maintained with the result that the scrapers are held operative to scrape the surface of the perforated bottom 14 and to discharge the filter bed through the openings 15.

In equipping a single tank for performing the mashing operation, the operations on the filter bed during the straining of the liquid and the scraping of the perforated bottom, it will be appreciated that the invention has considerably reduced the cost of plant equipment while maintaining the same efficiency together with the short filtering time of the lauter tank. A further advantage resides in the simplicity of the present equipment and the fact that the same can be installed in mash and strainer tanks in use at present, thereby converting them into combination mash and lauter tank at very little expense.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. A combination mash and lauter tank including a plurality of horizontal agitator shafts, a plurality of members secured to each of said shafts projecting radially therefrom, a drive shaft supporting said agitator shafts for bodily rotation around the drive shaft as an axis and for rotation on their own axis, said members being rotated to agitate liquid contained in said tank, and means holding said agitator shafts against rotation in a certain direction, certain of said members having additional utility when the agitator shafts are held against rotation but are caused to bodily rotate with the drive shaft.

2. A combination mash and lauter tank including a plurality of horizontal agitator shafts, a plurality of members secured to each of said shafts projecting radially therefrom, a drive shaft supporting said agitator shafts for bodily rotation around the drive shaft as an axis and for rotation on their own axis, said members being rotated to agitate liquid contained in said tank, means holding said agitator shafts against rotation in a certain direction, certain of said members having additional utility when the agitator shafts are held against rotation but are caused to bodily rotate with the drive shaft, and hydraulically actuated means for adjustably positioning said agitator shafts vertically of said drive shaft.

3. A combination mash and lauter tank, including a vertical drive shaft extending within the tank at the approximate center thereof, a plurality of horizontal shafts supported from said drive shaft and extending radially therefrom, means mounted on the inner end of each shaft adapted to drive the same when the drive shaft rotates in a certain direction causing bodily movement of the shafts around the drive shaft as an axis, said means being rendered inoperative when the horizontal shafts have bodily rotation in an opposite direction, and agitators, blades and scrapers carried by each of said horizontal shafts.

4. A combination mash and lauter tank, including a vertical drive shaft extending within the tank at the approximate center thereof, a plurality of horizontal shafts rotatably supported from said drive shaft and extending radially therefrom, each of said shafts having agitators, blades and scrapers secured thereto, said horizontal shafts rotating when the drive shaft revolves in one direction, whereby the agitators, blades and scrapers thoroughly agitate the liquid in the tank, and said horizontal shafts being held against rotation when the drive shaft revolves in the opposite direction, said shafts being optionally stopped in such position that the blades may be used for lautering or the scrapers for removing the solid material from the bottom of the tank.

5. A combination mash and lauter tank, including a vertical drive shaft extending within the tank at the approximate center thereof, a plurality of horizontal shafts rotatably supported from said drive shaft and extending radially therefrom, each of said horizontal shafts having agitators, blades and scrapers secured thereto, and means on the inner end of each shaft adapted to drive the same when the drive shaft revolves in a certain direction causing bodily movement of the shafts around the drive shaft as an axis, whereby the agitators, blades and scrapers thoroughly agitate the liquid in the tank, said means being rendered inoperative when the horizontal shafts have bodily rotation in an opposite direction to permit the blades to be used for lautering or the scrapers for removing the solid material from the bottom of the tank.

6. A combination mash and lauter tank including a vertical drive shaft extending within the tank and supporting a plurality of horizontal shafts whereby said shafts have bodily movement when the drive shaft revolves, means concentric with said drive shaft and non-rotatably held with respect thereto, pinions on the inner end of said horizontal shafts engaging said means, said pinions being operative to rotate the horizontal shafts when they have bodily movement in a certain direction, and agitators, blades and scrapers secured to said shafts for agitating liquid in the tank when the shafts revolve and have bodily movement around the drive shaft as an axis, said pinions being inoperative for rotating the shafts when they have bodily movement in the opposite direction to permit the blades to be used for lautering or the scrapers for removing the solid material from the bottom of the tank.

ELLSWORTH J. WESTCOTT.
ALBERT E. RUEMMELE.